United States Patent [19]
Tomitaka

[11] Patent Number: 6,122,136
[45] Date of Patent: *Sep. 19, 2000

[54] RECORDING AND/OR REPRODUCING APPARATUS HAVING A TAPE LOADING MECHANISM

[75] Inventor: Akira Tomitaka, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/661,586

[22] Filed: Jun. 7, 1996

[30] Foreign Application Priority Data

Jun. 13, 1995 [JP] Japan .................................. 7-146204

[51] Int. Cl.$^7$ ............................ G11B 5/027; G11B 5/008
[52] U.S. Cl. .............................................. 360/85; 360/95
[58] Field of Search ................................ 360/85, 95, 84; 242/346, 346.1, 354, 354.1, 354.2

[56] References Cited

U.S. PATENT DOCUMENTS

| | | | |
|---|---|---|---|
| 5,200,865 | 4/1993 | Yoon | 360/85 |
| 5,262,909 | 11/1993 | Chiou et al. | 360/85 |
| 5,381,283 | 1/1995 | Lee | 360/85 |
| 5,612,836 | 3/1997 | Kim et al. | 360/85 |
| 5,617,270 | 4/1997 | Tzeng et al. | 360/85 |
| 5,636,079 | 6/1997 | Choi | 360/85 |

*Primary Examiner*—William R. Korzuch
*Attorney, Agent, or Firm*—Fitzpatrick, Cella, Harper & Scinto

[57] ABSTRACT

A recording and/or reproducing apparatus for recording or reproducing information on or from a tape has a loading mechanism having a plurality of links for drawing the tape out of a cassette. The plurality of links include a first and a second link rotatably coupled to each other, the first link being rotatably supported on the chassis, the second link having a tape guide member for drawing the tape out of the cassette and bringing it into contact with the head. At the start of the operation of the plurality of links, the second link is rotated while the first link is stationary.

21 Claims, 12 Drawing Sheets

RECORDING AND/OR REPRODUCING APPARATUS HAVING A TAPE LOADING MECHANISM

BACKGROUND OF THE INVENTION

1. Field of the Invention

The present invention relates to a recording and/or reproducing apparatus, such as a VTR, having a tape loading mechanism for drawing a tape out of a cassette and winding it around a head, such as a rotating drum head.

2. Description of the Related Art

Conventionally, there has been available a so-called cassette-slide type VTR, in which the tape cassette (on which the VTR is loaded) is brought close to the rotating drum to thereby cause a part of the rotating drum to be accommodated in an opening portion of the cassette, thereby achieving a reduction in the depth dimension of the apparatus as a whole.

First, a VTR of this type and, in particular, the tape loading mechanism thereof, will be described with reference to FIGS. 10 through 12. FIG. 10 is a plan view of the VTR in the unloaded state; FIG. 11 is a plan view of the VTR in the state in which loading has been completed; and FIG. 12 is a schematic plan view illustrating the tape path in the loading-completed state.

In FIG. 10, a tape cassette 103 is mounted on a slide chassis 102, which is moved in the direction indicated by an arrow a' with respect to a main chassis 101, and then the slide chassis 102 is moved in the direction of an arrow a to be brought close to a rotating drum 105 on the main chassis 101. As the slide chassis 102 is thus moved in the direction of the arrow a, a first link 107, which is rotatably supported by a link axle 106 provided on the main chassis 101, is rotated in the direction of an arrow b since the first link 107 is then pushed by a driving pin 109, which is provided on the slide chassis 102 and engaged with an elongated hole 108 formed in this first link 107.

As a result, a second link 111 connected to the first link 107 by a connection axle 110 at the forward end of the first link 107 is pushed so as to be displaced in the direction indicated by an arrow c, and a tape guide base 113, which is supported by a support axle 112 at the forward end of the second link 111, is moved in the direction as indicated by an arrow d along a guide rail 114 provided on the main chassis 101. A magnetic tape 104 is drawn out of an opening portion 103a of the cassette 103 by a guide post group 115 on the tape guide base 113. The construction and operation of the links on the other side are substantially the same as those of the above described ones.

Finally, as shown in FIGS. 11 and 12, substantially half the rotating drum 105 is caused to be inserted into the opening portion 103a of the cassette 103 by the displacement of the slide chassis 102 and, at the same time, the loading of the tape 104 along a predetermined path, including the winding thereof around the peripheral surface of the rotating drum 105, is effected by the displacement of the tape guide base 113. In this condition, the tape 104 is brought into press contact with a capstan 116 by a pinch roller (not shown), and the tape 104 is run to perform a desired recording or reproducing operation by the magnetic head of the rotating drum 105.

In the case, for example, of a cassette for digital VTR or the like, in which the opening portion 103a of the cassette 103 is small, when a reduction in depth dimension is to be achieved by accommodating the rotating drum 105 in the opening portion 103a, the tape guide base at the time of unloading is situated near the center of the opening portion 103a as indicated by a broken line 113' in FIG. 10.

This indicates the fact that, in the case of the tape loading mechanism as described above, which uses the first link 107 and the second link 111, the tape guide base 113' approaches the link axle 106, which is the center of rotation of the first link 107, the requisite movement of the base 113' at the time of loading start being in the direction from the vicinity of the link axle 106 to the exterior as indicated by an arrow e.

Thus, even if the first link 107 is rotated in the direction of the arrow b as described above, the second link 111', which is at a position indicated by the broken line, cannot be displaced, so that the operation of moving the base 113' is impossible.

SUMMARY OF THE INVENTION

It is an object of the present invention to provide a recording and/or reproducing apparatus having a tape loading mechanism capable of reliably displacing the tape guide member, which is at the forward end of a plurality of links, even when the tape guide member is near the center of the rotation on the link chassis side.

To achieve the above object, there is provided, according to an aspect of the present invention, a recording and/or reproducing apparatus for recording or reproducing information on or from a tape drawn out of a cassette, the recording and/or reproducing apparatus comprising:

a chassis having a head, which is capable of recording or reproducing information on or from the tape; and a loading mechanism having a plurality of links including a first and a second link rotatably coupled to each other, the first link being rotatably supported on the chassis, the second link having a tape guide member for drawing the tape out of the cassette and bringing it into contact with the head, wherein, at the start of the operation of the plurality of links, the second link is rotated while the first link is stationary.

According to another aspect of the present invention, there is provided a recording and/or reproducing apparatus for recording or reproducing information on or from a tape drawn out of a cassette, the recording and/or reproducing apparatus comprising:

a first chassis having a head, which is capable of recording or reproducing information on or from the tape;

a second chassis on which the cassette is placed and which is capable of moving relative to the first chassis; and a loading mechanism having a plurality of links including a first and a second link rotatably coupled to each other, the first link being rotatably supported on the chassis, the second link having a tape guide member for drawing the tape out of the cassette and bringing it into contact with the head, wherein, at the start of the operation of the plurality of links, the second link is rotated while the first link is stationary.

Further objects and features of the present invention will become apparent from the following description and drawings.

DETAILED DESCRIPTION OF THE PREFERRED EMBODIMENTS

Figure 1:
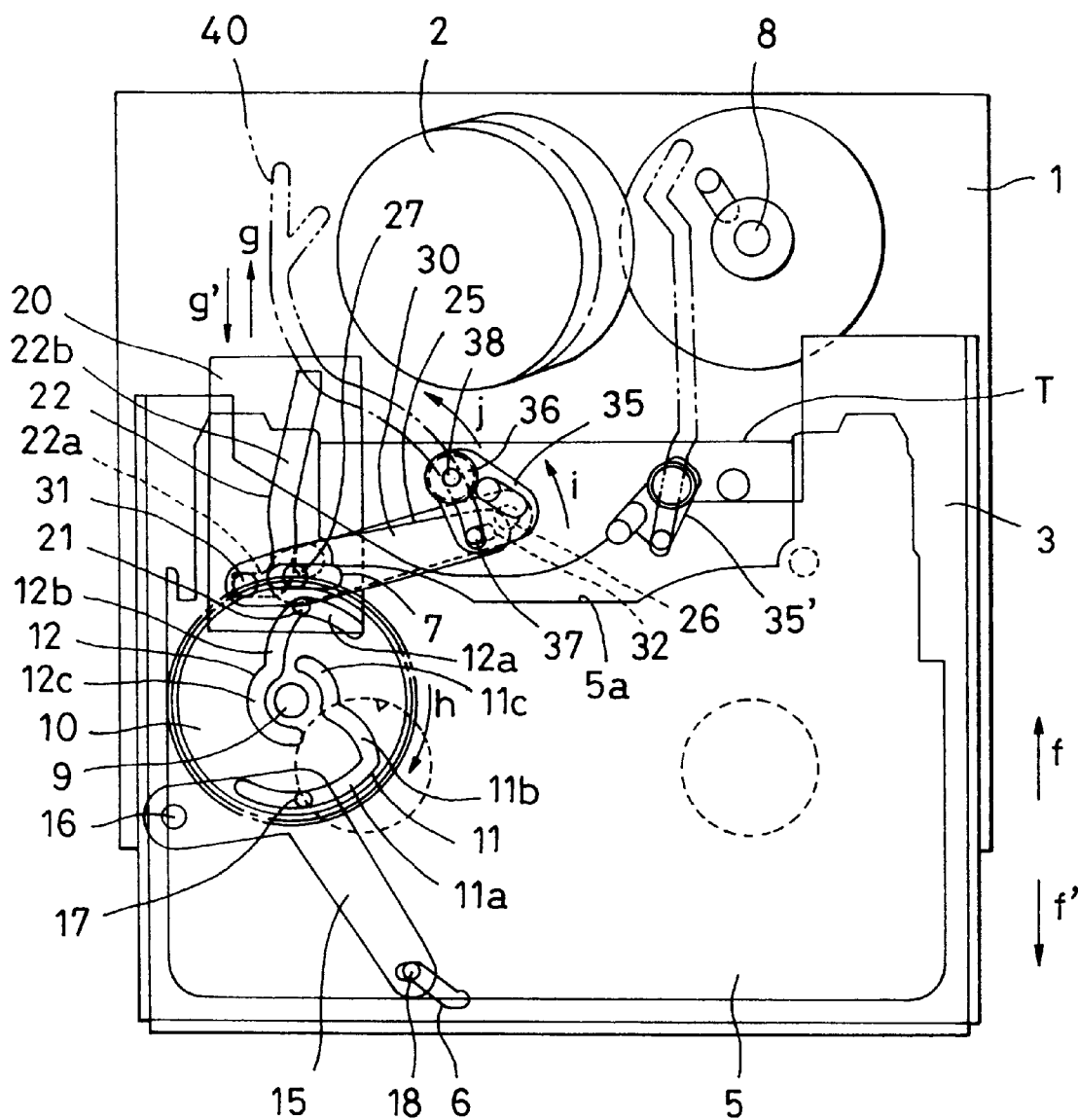
FIG. 1 is a plan view of a VTR to which a first embodiment of the present invention is applied, showing the VTR in the unloaded state.
Figure 2:
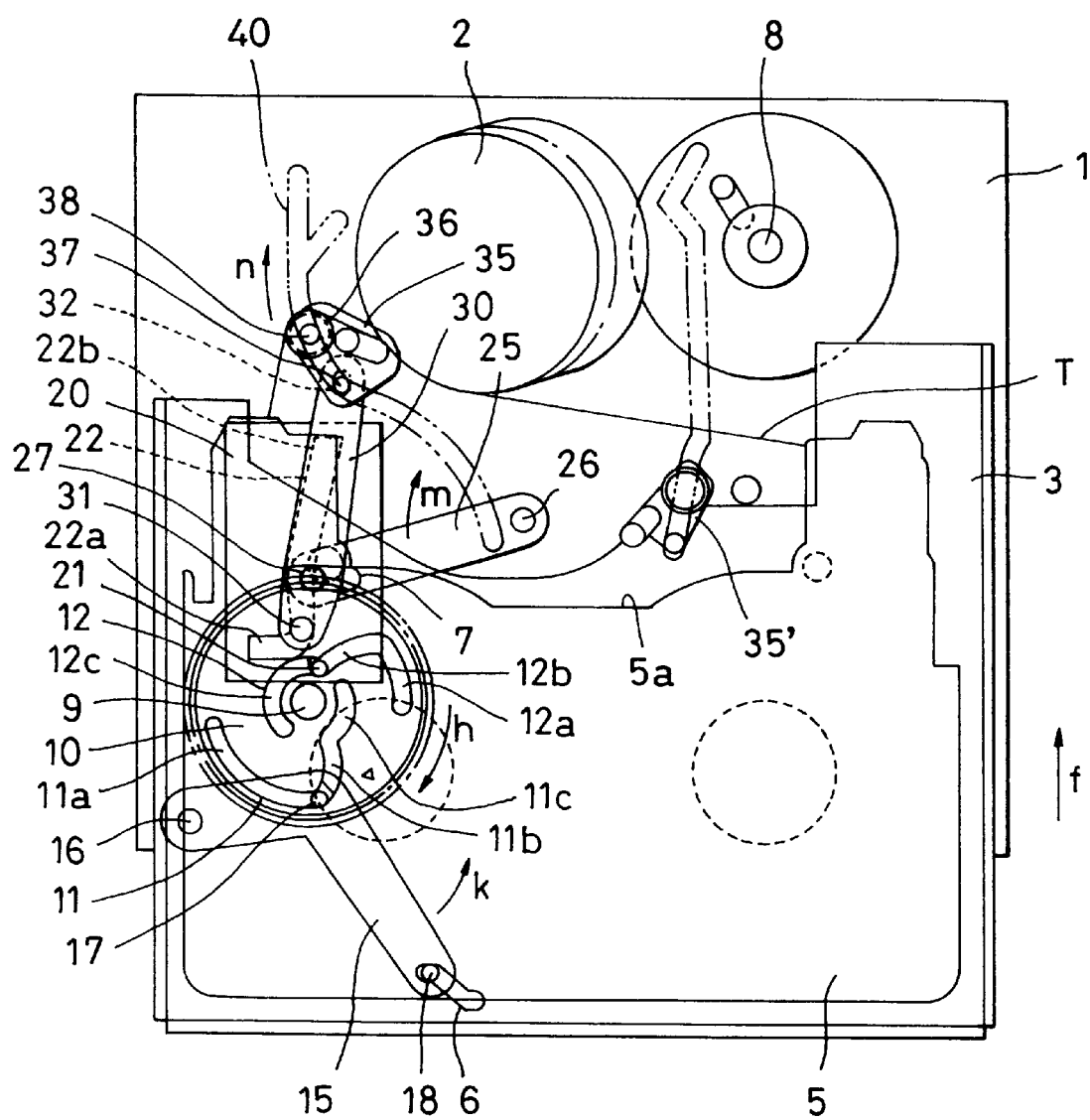
FIG. 2 is a plan view illustrating how a second link in the first embodiment rotates.
Figure 3:
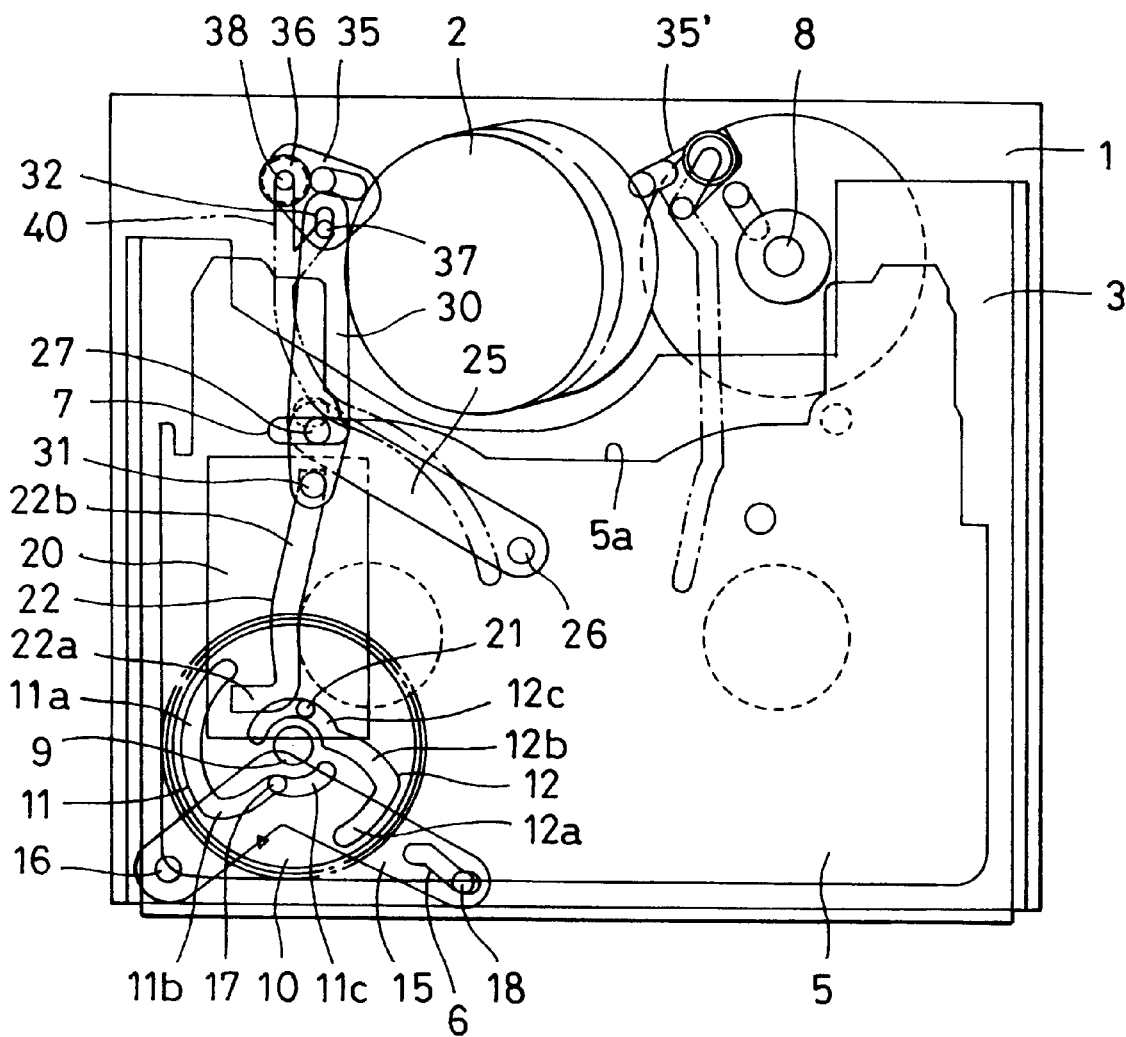
FIG. 3 is a plan view showing the state in which loading has been completed in the first embodiment.
Figure 4:
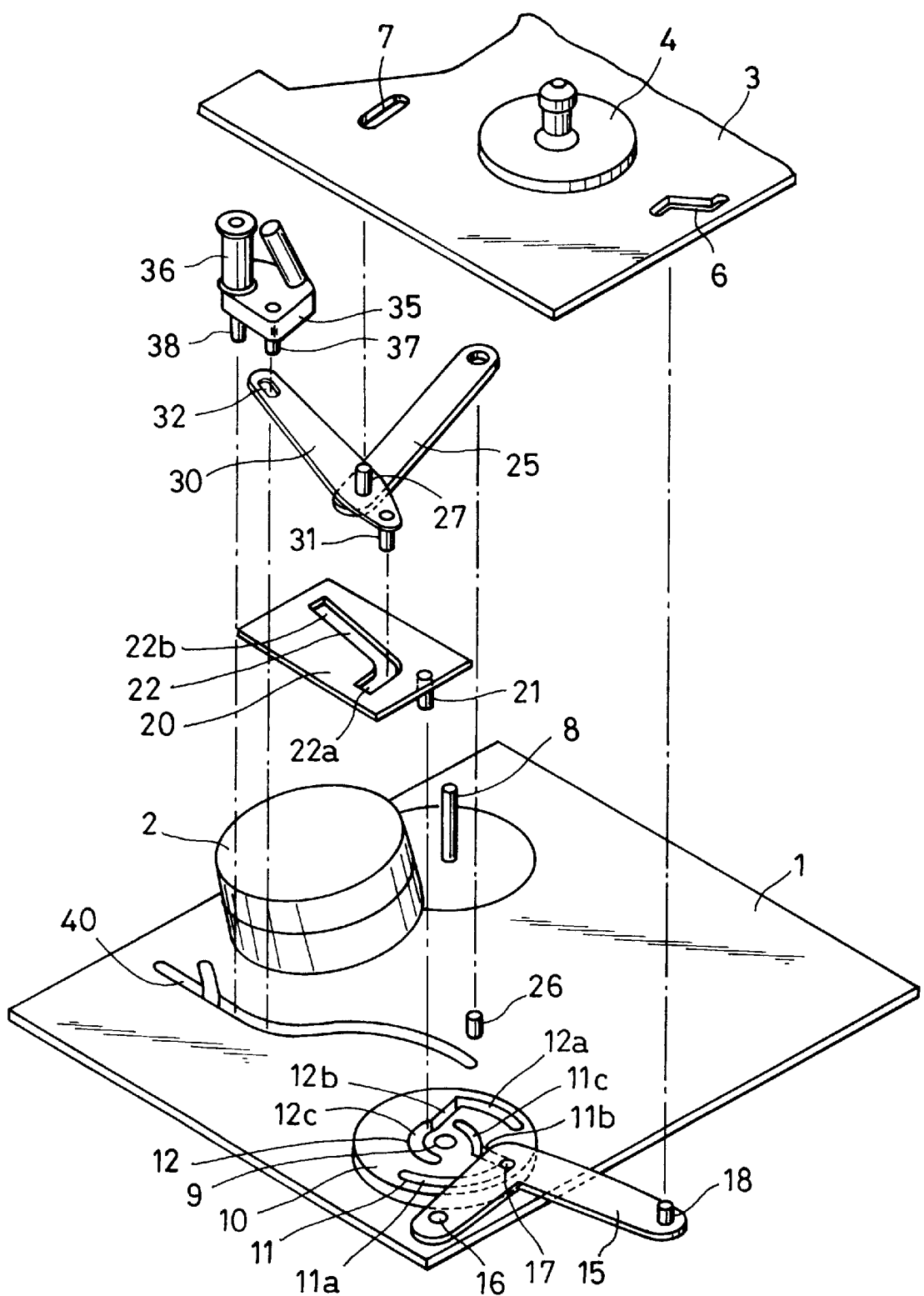
FIG. 4 is an exploded perspective view showing the positional relationship between the members in the first embodiment.
Figure 5:
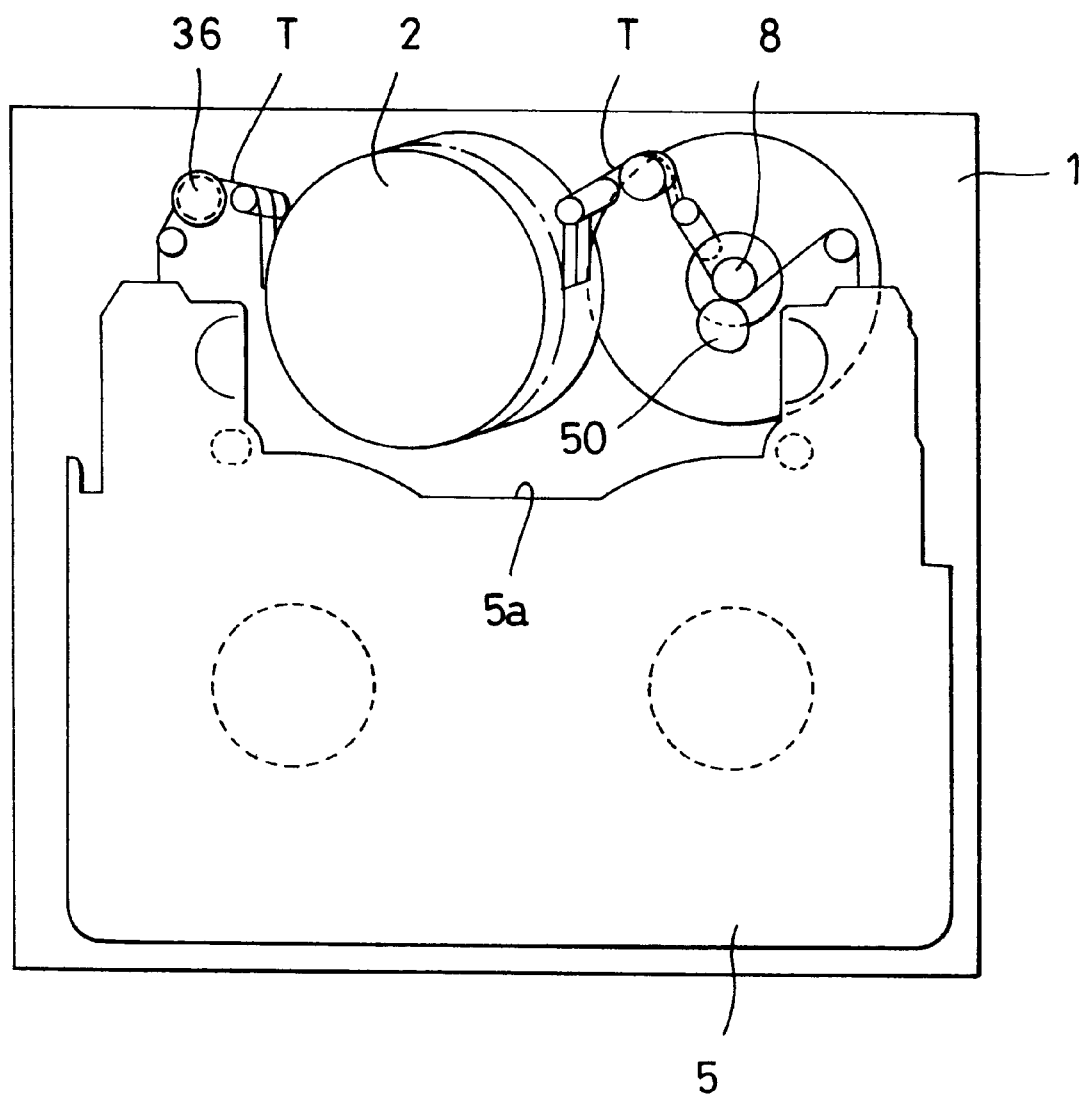
FIG. 5 is a schematic plan view showing the tape path in the loading-completed state in the first embodiment.

Embodiments of the present invention, applied to VTR, will now be described with reference to FIGS. 1 through 9. FIGS. 1 through 5 show the first embodiment, and FIGS. 6 through 9 show the second embodiment. FIG. 1 is a plan view showing the unloaded state; FIG. 2 is a plan view illustrating how a second link rotates; FIG. 3 is a plan view showing the state in which loading has been completed; FIG. 4 is an exploded perspective view showing the positional relationship between the members; and FIG. 5 is a schematic plan view showing the tape path in the loading-completed state.

In FIGS. 1 through 4, numeral 1 indicates a main chassis serving as the first chassis, on which a rotating drum 2 carrying a magnetic head for recording or reproduction is mounted in an inclined position through the intermediation of a mounting member (not shown). Numeral 3 indicates a slide chassis serving as the second chassis on which a reel base 4 (See FIG. 4) is provided and to which a tape cassette 5 (accommodating a magnetic tape T wound around reels) is attached by means of a cassette holder and a positioning member (which are not shown). The chassis 3 is constructed such that it can move in the directions indicated by arrows f and f' relative to the main chassis 1. In the slide chassis 3, there are provided a slide groove 6, which is the part to be pressed when the chassis 3 is moved, and a link groove 7 serving as the driving section when a first link 25 described below is rotated. Numeral 8 indicates a capstan protruding from the main chassis 1.

Numeral 10 indicates a cam gear, which is rotatably supported by a gear shaft 9 provided on the main chassis 1 and is rotated by a loading motor (not shown), forming a unitary driving means for driving the tape loading mechanism and the slide chassis 3. The cam gear 10 is provided with a first cam groove 11 and a second cam groove 12. The first cam groove 11 has cam sections 11a through 11c, and the second cam groove 12 has cam sections 12a through 12c. The cam gear 10 is not necessarily a gear drive type. Any type of cam rotating member will serve the purpose.

Numeral 15 indicates a slide lever, which is rotatably supported by a lever shaft 16 provided on the main chassis 1. The slide lever 15 is provided with a guide pin 17 and a driving pin 18 serving as the chassis pressing section. The guide pin 17 is slidably engaged with the first cam groove 11 of the cam gear 10, and the driving pin 18 is slidably engaged with the slide groove 6 of the slide chassis 3.

Numeral 20 indicates a driving plate, which can move in the directions indicated by arrows g and g' (in parallel with the direction of movement of the slide chassis 3). The driving plate 20 is provided with a driving pin 21 and a link guide groove 22. The driving pin 21 is slidably engaged with the second cam groove 12 of the cam gear 10, and the link guide groove 22 has groove portions 22a and 22b bent substantially at right angles. The direction of the groove portion 22a is substantially orthogonal to the direction of movement of the driving plate 20, and the direction of the groove portion 22b substantially coincides with the direction of movement of the driving plate 20. In this way, a second link driving section for rotating a second link 30 is formed by the driving plate 20 having the link guide groove 22.

Numeral 25 indicates a first link, which is rotatably supported by a link rotation axle 26 provided on the main chassis 1. A link axle pin 27 is provided at the forward end of the first link 25, and the link axle pin 27 is slidably engaged with the link groove 7.

Numeral 30 indicates a second link, which is rotatably supported by the link axle pin 27 of the first link 25. The second link 30 is provided with a guide pin 31 and an elongated hole 32, and the guide pin 31 is slidably engaged with the link guide groove 22 of the driving plate 20.

Numeral 35 indicates a tape guide base, on which is mounted a guide post group 36 for drawing the tape T out of the cassette tape 5 and guiding the running of the tape T after loading. The base 35 and the post group 36 comprise a tape guide member. On the lower surface of the base 35, a connecting pin 37 and a guide pin 38 are provided, and the connecting pin 37 is slidably engaged with the elongated hole 32 of the second link 30.

Numeral 40 indicates a guide rail provided on the main chassis 1. It is slidably engaged with the connecting pin 37 and the guide pin 38, and guides the movement of the base 35 at the time of loading and unloading.

In the above-described construction, as shown in FIG. 1, in the unloaded state, the guide pin 17 of the slide lever 15 is at the cam section 11a in the first cam groove 11 of the cam gear 10, and, by the engagement of the driving pin 18 of the slide lever 15 with the slide groove 6 of the slide chassis 3, the slide chassis 3 is moved in the direction indicated by the arrow f'. Since the link axle pin 27 of the first link 25 is engaged with the link groove 7 of the slide chassis 3 (first driving member), the position of the first link is prescribed.

Further, since the driving pin 21 of the driving plate 20 is positioned at the cam section 12a in the second cam groove 12 of the cam gear 10, and the driving plate 20 (second driving member) is moved in the direction of the arrow g, the guide pin 31 of the second link 30 supported by the link axle pin 27 is positioned at the left-hand end of the groove portion 22a of the link guide groove 22 of the driving plate 20, whereby the second link 30 is rotated such that it is substantially superimposed on the first link 25, with the tape guide base 35 at the forward end being positioned substantially above the link rotation axle 26.

In this condition, the cassette 5 is attached to the slide chassis 3. The tape guide base 35 is situated near the center of the opening portion 5a of the cassette 5. When performing the loading operation after the attachment of the cassette 5, the cam gear 10 is first rotated in the direction of an arrow h by the loading motor. Since the driving pin 21 of the driving plate 20 is shifted from the cam section 12a to the cam section 12b, the driving plate 20 is moved in the direction of an arrow g'. With this movement of the driving plate 20, the position of the link guide groove 22 is also moved in the direction of the arrow g'.

At this time, the guide pin 17 of the slide lever 15 slides on the concentrical cam section 11a in the first cam groove 11 of the cam gear 10, so that the slide lever 15 is not operated, and the slide chassis 3 engaged with the driving pin 18 in the slide groove 6 is not moved.

Due to this stopping of the slide chassis 3, the first link 25 which is engaged with the link groove 7 of the slide chassis 3 by means of the link axle pin 27 is also kept stationary. Thus, due to the above-described movement of the driving plate 20, the guide pin 31 of the second link 30 is guided to the right along the groove portion 22a of the link guide groove 22, and the second link 30 alone is rotated in the direction of an arrow i around the link axle pin 27. By this rotation of the second link 30, the tape guide base 35 is moved in the direction of an arrow j along the guide rail 40, and the guide post group 36 is moved to the position of FIG. 2 while drawing the tape T out of the opening portion 5a of the cassette 5.

Even after the condition of FIG. 2 has been achieved, the cam gear 10 continues the rotation in the direction of the arrow h, so that the guide pin 17 of the slide lever 15 moves from the cam section 11a of the first cam groove 11 to the cam section 11b. As a result, the slide lever 15 starts to rotate in the direction of an arrow k. As a result, the driving pin 18 of the slide lever 15 presses the slide groove 6 of the slide chassis 3, so that the slide chassis 3 is moved in the direction of the arrow f, i.e., toward the rotating drum 2.

With this movement of the slide chassis 3, the link groove 7 presses the link axle pin 27 of the first link 25, so that the first link 25 is rotated in the direction of an arrow m around the axle of rotation 26. Further, when the slide chassis 3 starts to move, the driving pin 21 of the driving plate 20 slides on the concentrical cam section 12c in the second cam groove 12 of the cam gear 10, so that the driving plate 20 is kept at rest with respect to the main chassis 1. As a result, the guide pin 31 of the second link 30 becomes substantially free in the groove portion 22b of the link guide groove 22, and, during the sliding movement of the slide chassis 3, the second link 30 only has the role of a driven link connecting the first link 25 with the tape guide base 35. Thus, by the first link 25 which is rotated in the direction of the arrow m with the sliding movement in the direction of the arrow f of the slide chassis 3, the tape guide base 35 is moved in the direction of an arrow n along the guide rail 40.

Finally, as shown in FIGS. 3 and 5, substantially half the rotating drum 2 is inserted into the opening portion 5a of the cassette 5 by the movement of the slide chassis 3 and, at the same time, by the movement of the tape guide base 35, the loading of the tape T, including its winding around the peripheral surface of the rotating drum 2, is effected in a predetermined path. When this loading has been completed, the tape T is brought into press contact with the capstan 8 by a pinch roller 50, and the tape is run to effect a desired recording or reproduction by the head of the rotating drum 2.

In this way, in this embodiment, the second link 30 is rotated as the driving link with the rotation of the first link 25 being kept at rest before the sliding movement of the slide chassis 3 is started, so that, even when the tape guide base 35 approaches the link rotation axle 26 of the first link 25, the base 35 can be reliably moved from the interior of the opening portion 5a of the cassette 5 to the exterior. After this, the first link 25 is rotated as the driving link with the sliding movement of the slide chassis 3 to thereby move the tape guide base 35, so that, even when the opening portion 5a of the cassette 5, into which the rotating drum 2 is inserted, is a small space, it is possible to reliably draw the tape T out of the opening portion 5a.

Further, in this embodiment, the direction of rotation of the second link 30 at the loading start is the direction indicated by the arrow i, and the direction of the subsequent rotation of the first link 25 is the direction indicated by the arrow m. Since they are rotated in opposite directions, it is possible to reduce the requisite space for the moving operation of the links as a whole.

Further, in this embodiment, the driving plate 20 having the link guide groove 22 is provided on the main chassis 1 side as the second link driving section for rotating the second link 30, and the link groove 7 for rotating the first link 25 is provided on the slide chassis 3 side as the first link driving section for rotating the first link 25, whereby the rotation of the second link 30 with the slide chassis 3 being stationary, that is, with the rotation of the first link 25 being stationary, and the rotation of the first link 25 with the driving plate 20 being at rest, that is, with the second link 30 being driven, can be reliably performed independently of each other and with a simple construction.

Furthermore, in this embodiment, the tape loading mechanism and the slide chassis 3 are driven by the cam gear 10 as a unitary driving means, so that the operations from the rotation of the second link 30 to the rotation of the first link 25 with the movement of the slide chassis 3 can be continuously effected with a simple construction.

The unloading operation in this embodiment is an operation reverse to the loading operation described above. Further, while in this embodiment a description of the movement of the other tape guide base 35' is omitted, a conventional loading mechanism is applicable thereto since, in the unloaded state of FIG. 1, this base 35' is spaced apart from the axle of rotation 26 of the link in the opening portion 5a of the cassette 5, and its path of movement is substantially linear, so that a conventional loading mechanism is applicable.

Figure 6:
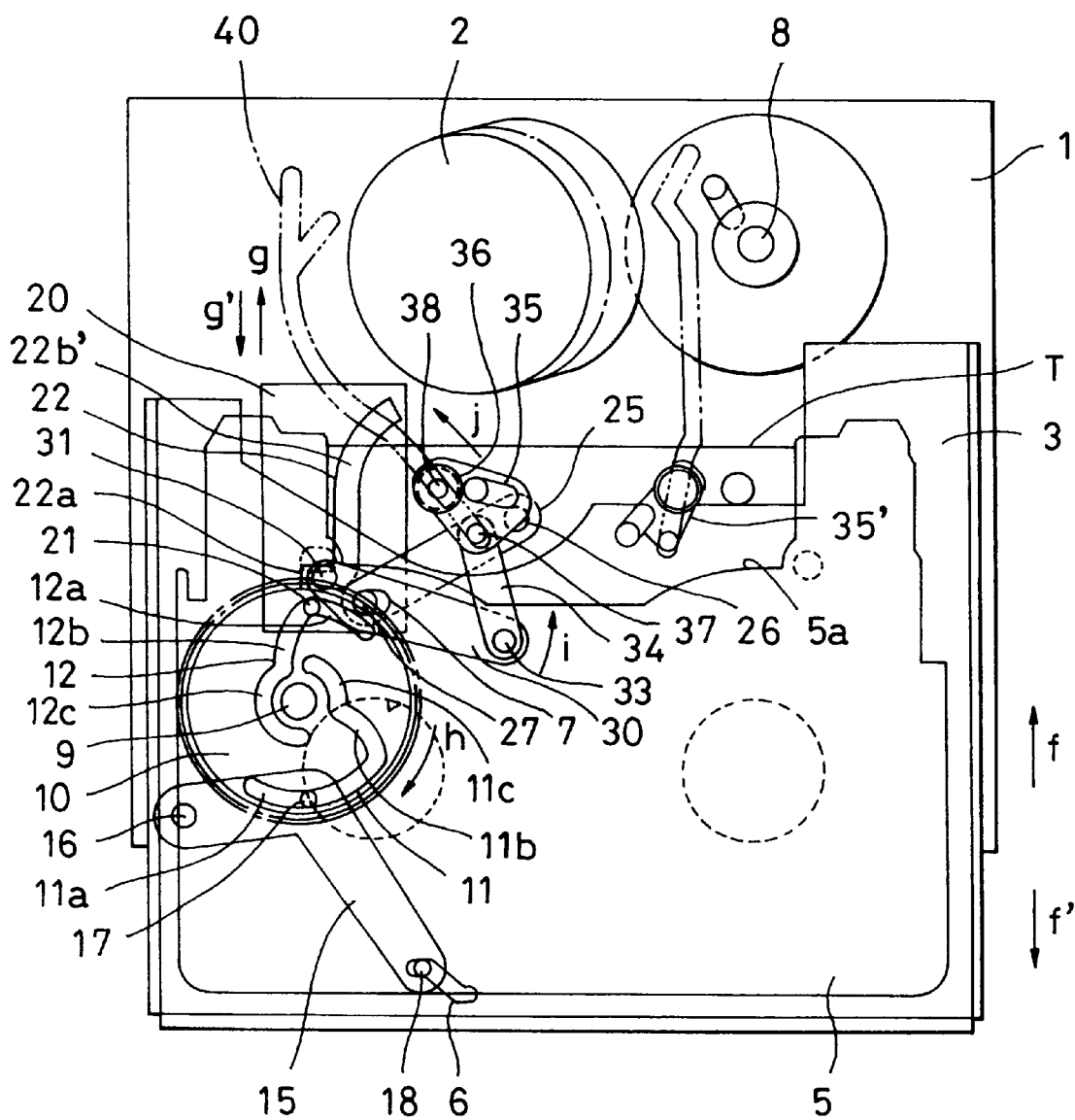
FIG. 6 is a plan view of a VTR to which a second embodiment of the present invention is applied, showing the VTR in the unloaded state.
Figure 7:
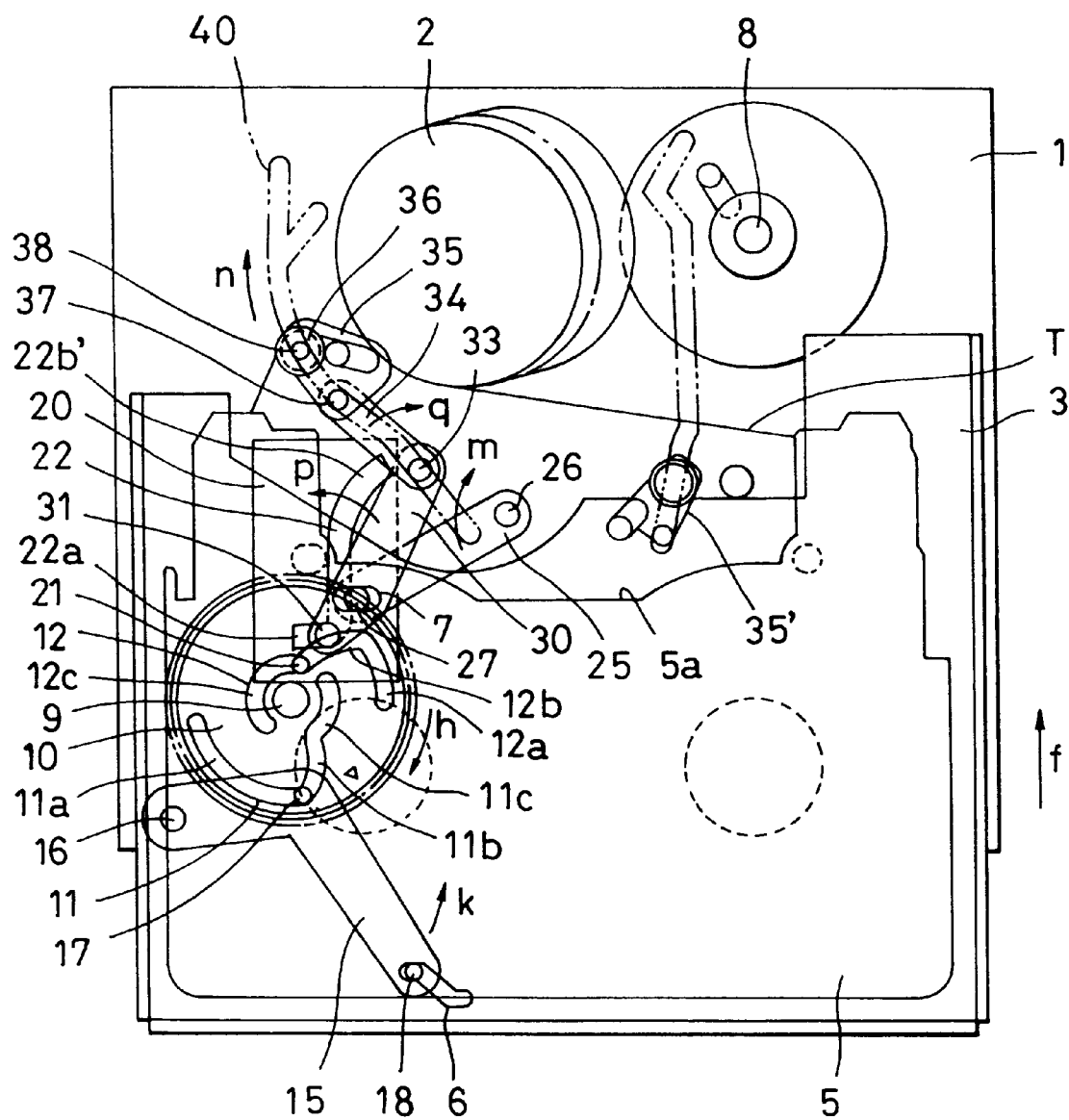
FIG. 7 is a plan view illustrating how a second link (in the second embodiment) rotates.
Figure 8:
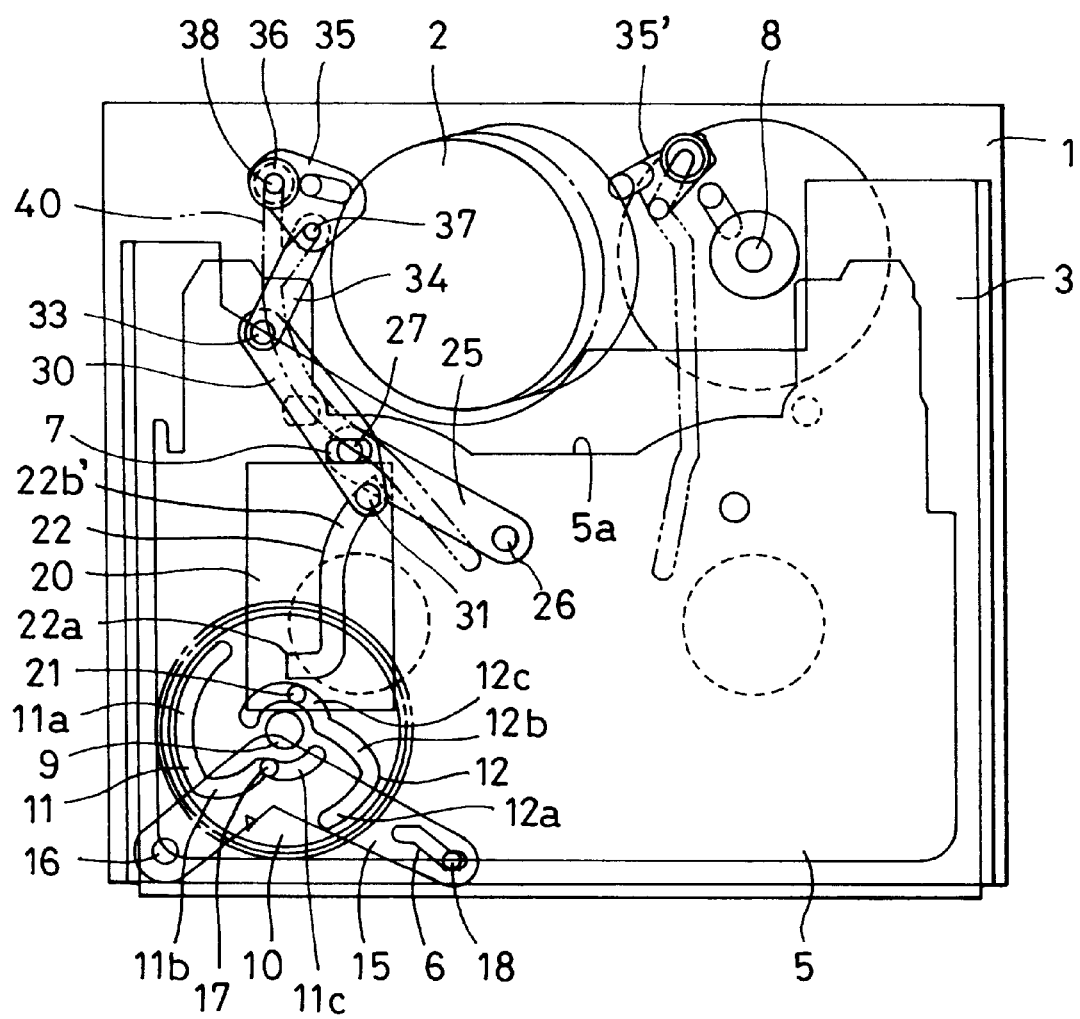
FIG. 8 is a plan view showing the state in which loading has been completed in the second embodiment.
Figure 9:
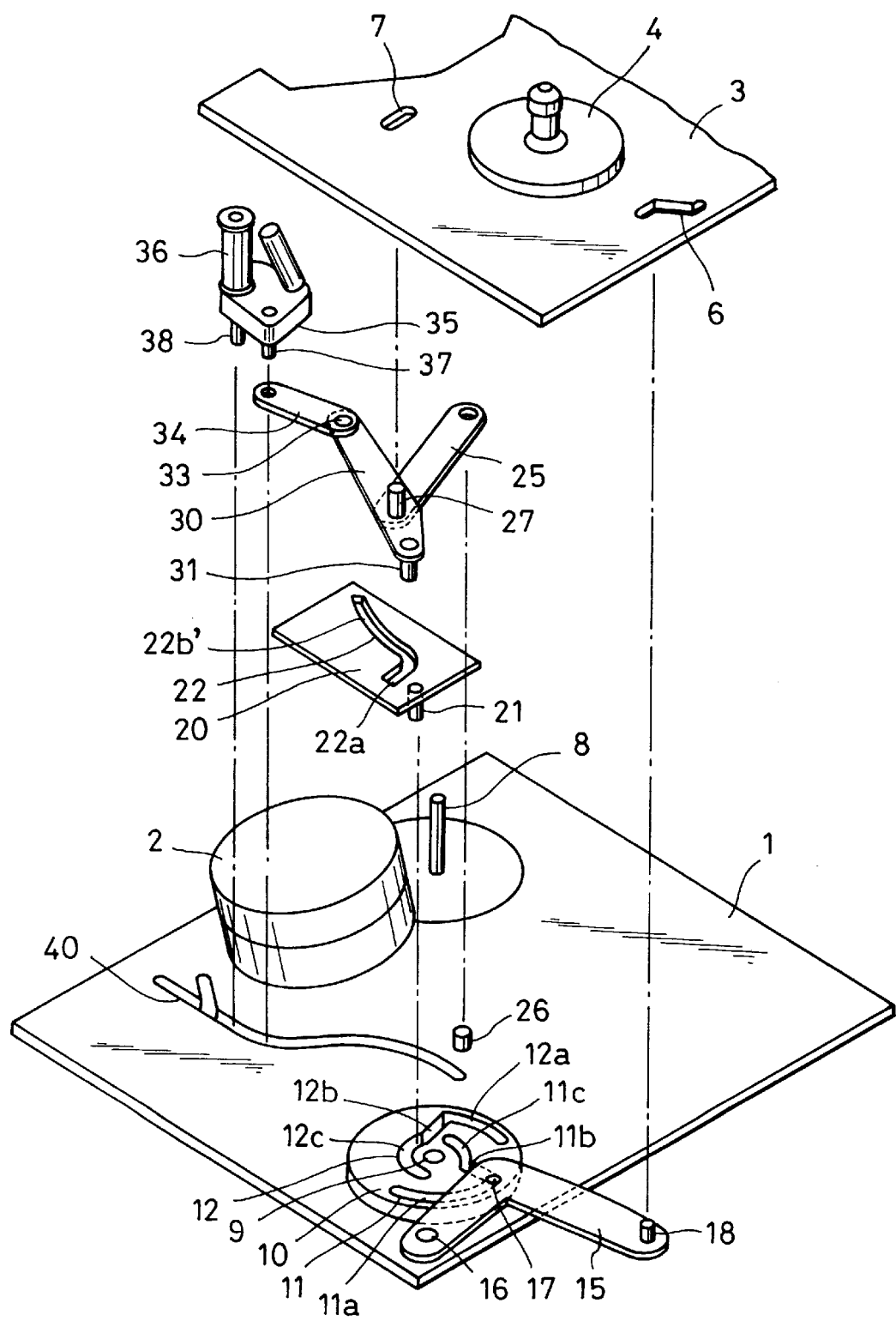
FIG. 9 is an exploded perspective view showing the positional relationship between the members in the second embodiment.
Figure 10:
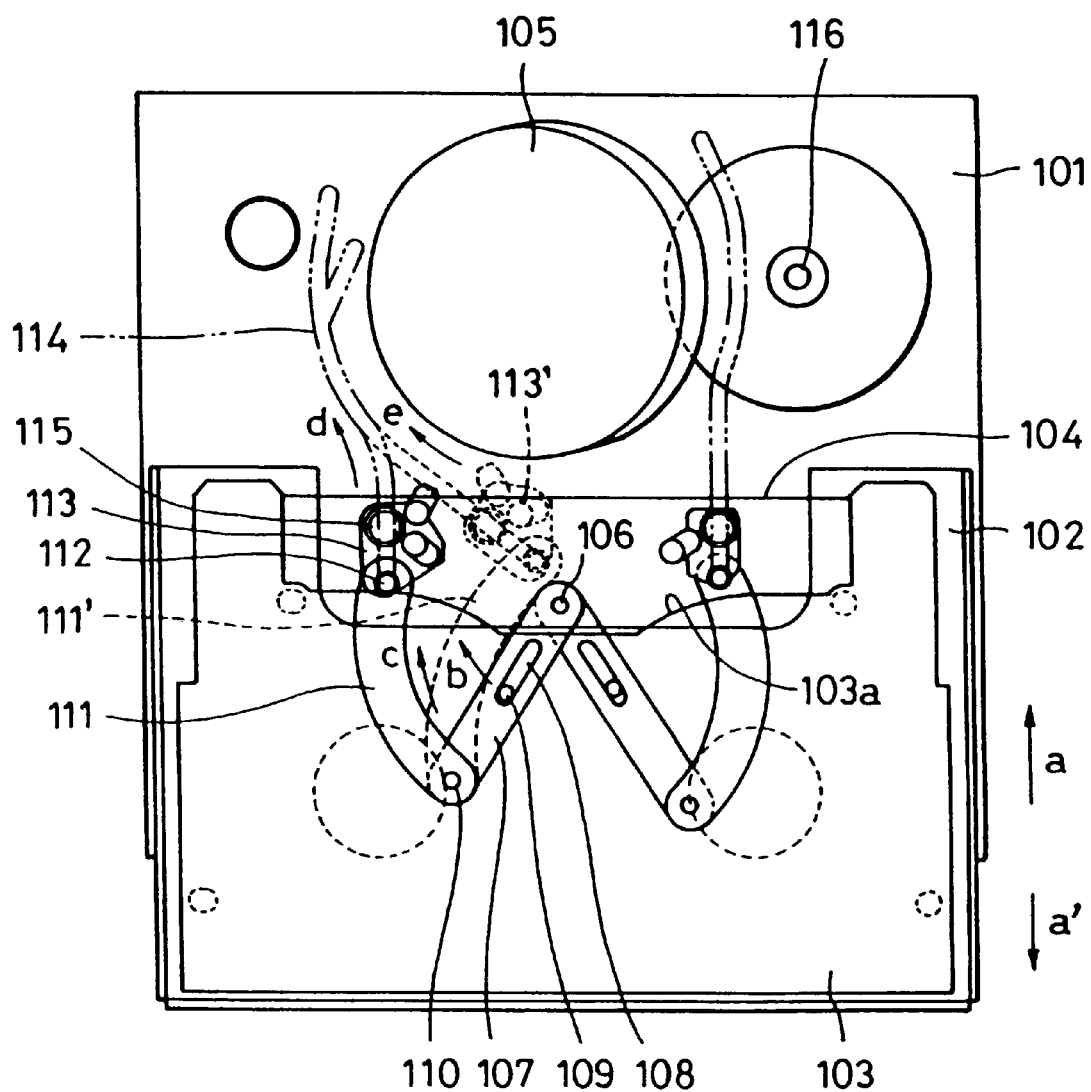
FIG. 10 is a plan view of a conventional VTR in the unloaded state.
Figure 11:
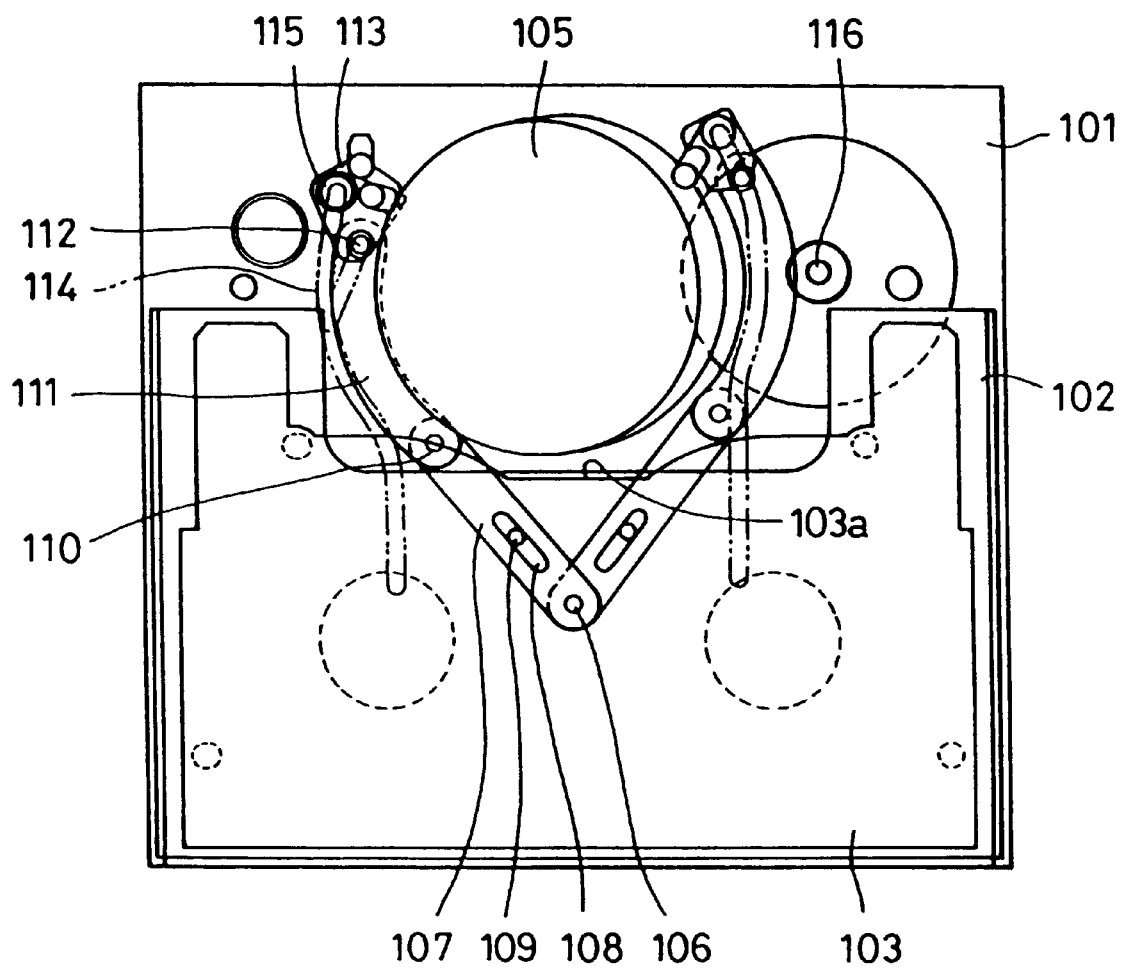
FIG. 11 is a plan view showing the state in which loading has been completed in the conventional VTR.
Figure 12:
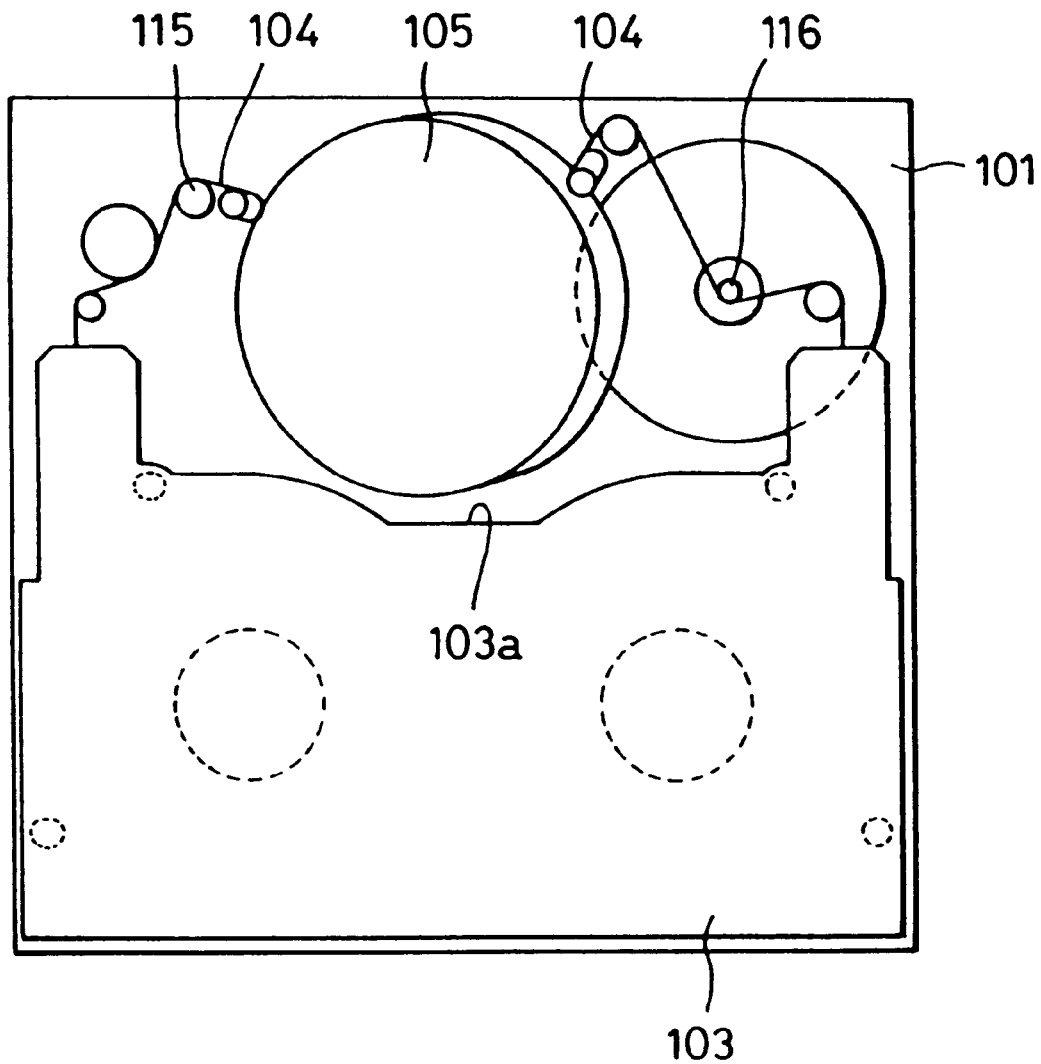
FIG. 12 is a schematic plan view showing the tape path in the loading-completed state in the conventional VTR.

Next, FIGS. 6 through 9 show the second embodiment, of which FIG. 6 is a plan view of a VTR in the unloaded state; FIG. 7 is a plan view showing how a second link rotates; FIG. 8 is a plan view showing the loading-completed condition; and FIG. 9 is an exploded perspective view showing the positional relationship of the members. The components which are the same as those of the first embodiment are indicated by the same reference numerals. The tape path in the loading-completed state is the same as that shown in FIG. 5.

In the second embodiment, the first link 25 and the second link 30 are substantially the same as those of the first embodiment. In the second embodiment, however, a third link 34 is rotatably supported at the forward end of the second link 30 by means of a connecting axle 33, and a connecting pin 37 of the tape guide base 35 is rotatably supported at the forward end of the third link 34. Further, the link guide groove 22 of the driving plate 20 and, in particular, a groove portion 22b' thereof, is gradually bent toward the side of the link rotation axle 26 of the first link 25 as it extends toward the forward end thereof.

The loading operation in this embodiment is basically substantially the same as that in the first embodiment.

However, as shown in FIGS. 6 and 7, by the rotation of the second link 30 in the direction of the arrow i, the tape guide base 35 is moved in the direction of the arrow j along the guide rail 40 through the intermediation of the third link 34.

Further, as shown in FIGS. 7 and 8, when the first link rotates in the direction of the arrow m with the sliding motion in the direction of the arrow f of the slide chassis 3, the second link 30, rotatably supported by the link axle pin 27 of the first link 25, is controlled in its rotation at the guide pin section 31 by the groove portion 22b' of the link guide groove 22 of the driving plate 20 at rest and, at the same time, rotates in the direction of the arrow p around the link axle pin 27, and at the same time, revolves around the axle of rotation 26. By this rotation and revolution of the second link 30, the tape guide base 35 is moved in the direction of the arrow n along the guide rail 40 through the third link 34. That is, the second link 30 is rotated in the direction of the arrow p, and the third link 34 is rotated in the direction of the arrow q around the connecting axle 33, and the loading operation is completed in the position as shown in FIG. 8.

As in this second embodiment, even when three links are used, the loading operation can be reliably performed as described above. Further, in this case also, while the second link 30 rotates in the direction of the arrow p, the third link is reversely rotated in the direction of the arrow q, so that the requisite space for the moving operation of the links as a whole can be reduced.

Further, in this example also, the unloading operation is reverse to the loading operation as described above.

The present invention is not restricted to the above-described embodiments but allows various effective modifications and applications without departing from the scope of the invention. For example, while in the embodiments the second link is rotated with the first link being stationary, it is also possible to start the rotation of the first link, that is, the movement of the slide chassis, before the rotation of the second link has stopped.

As described above, in a tape loading mechanism of according to an embodiment of the present invention, in a construction in which a tape guide member is moved by a plurality of links, a second link connected with the forward end of a first link is formed as a driving link which is at least capable of rotating with the first link being stationary, whereby, even when the tape guide member approaches the center of rotation of the first link, it is possible for the tape guide member to move, which has been impossible in the prior art.

In a recording and/or reproducing apparatus according to another aspect of the present invention, a second link is rotated with a first link being at rest before a second chassis with a cassette attached thereto makes a sliding motion to thereby move the tape guide member from the interior of the cassette opening portion to the exterior and, after this, the first link is rotated with the sliding motion of the second chassis, whereby it is possible to change the timing of movement of the tape guide member and the second chassis for reliable loading even when the tape guide member approaches the center of rotation of the first link within the opening portion. Further, it is also possible to reduce the requisite space for the movement of the links as a whole.

What is claimed is:

1. A recording and/or reproducing apparatus for recording information on and/or reproducing information from a tape drawn out of a cassette, said recording and/or reproducing apparatus comprising:
   (a) a chassis having a head, which is capable of recording information on and/or reproducing information from the tape;
   (b) a loading mechanism for loading the tape to the head and having a plurality of links including a first link and a second link pivotally coupled to each other on a common axis, the first link being rotatably supported on the chassis, and the second link including a tape guide member for drawing the tape out of the cassette and bringing it into contact with the head; and
   (c) means for holding the first links at an initial position and rotating the second link, at the start of the loading operation, and then rotating the first link to move the second link and the common axis.

2. A recording and/or reproducing apparatus according to claim 1, wherein the first link is connected to the second link, the first and second links are rotated in opposite directions.

3. A recording and/or reproducing apparatus according to claim 2, wherein the second link has a third link, the forward end of which is coupled to said tape guide member.

4. A recording and/or reproducing apparatus according to claim 1, wherein said loading mechanism has a first driving member for operating the first link and a second driving member for operating the second link.

5. A recording and/or reproducing apparatus according to claim 4, wherein the first driving member is driven by the second driving member.

6. A recording and/or reproducing apparatus according to claim 5, wherein the second driving member comprises a cam member rotatably supported by said chassis.

7. A recording and/or reproducing apparatus according to claim 6, wherein the first driving member comprises a slide member engaged with said cam member.

8. A recording and/or reproducing apparatus according to claim 4, wherein the second driving member comprises a cam member rotatably supported by said chassis.

9. A recording and/or reproducing apparatus according to claim 4, wherein said first driving member has a guide member for guiding the first link.

10. A recording and/or reproducing apparatus for recording information on and/or reproducing information from a tape drawn out of a cassette, said recording and/or reproducing apparatus comprising:
    (a) a first chassis having a head for recording information on and/or reproducing information from the tape;
    (b) a second chassis on which the cassette is placed, for moving relative to the first chassis;
    (c) a load mechanism for loading the tape to the head and having a plurality of links including a first link and a second link pivotally coupled to each other on a common axis, the first link being rotatably supported on the first chassis, and the second link having a tape guide member for drawing the tape out of the cassette and bringing it into contact with the head; and
    (d) means for holding the first link at an initial position and rotating the second link, at the start of the loading operation, and then rotating the first link to move the second link and the common axis.

11. A recording and/or reproducing apparatus according to claim 10, wherein the first link is connected to the second link, the first and second links are rotated in opposite directions.

12. A recording and/or reproducing apparatus according to claim 11, wherein the second link has a third link, the forward end of which is coupled to said tape guide member.

13. A recording and/or reproducing apparatus for recording information on and/or reproducing information from a tape drawn out of a cassette, said recording and/or reproducing apparatus comprising:

(a) a first chassis having a head for recording information on and/or reproducing information from the tape;

(b) a second chassis on which the cassette is placed, for moving relative to the first chassis;

(c) a loading mechanism for loading the tape to the head and having a plurality of links including a first link and a second link pivotally coupled to each other about a common axis, the first link being rotatably supported on the first chassis, and the second link having a tape guide member for drawing the tape out of the cassette and bringing it into contact with the head; and (d) means for rotating the second link, wherein, at the start of the loading operation, the second link is rotated while the first link is stationary, wherein said loading mechanism includes a driving member for operating the second link, and wherein said second chassis operates the first link.

14. A recording and/or reproducing apparatus according to claim 13, wherein said second chassis is driven by the driving member.

15. A recording and/or reproducing apparatus according to claim 14, wherein the driving member comprises a cam member rotatably supported by the first chassis.

16. A recording and/or reproducing apparatus according to claim 15, wherein said second chassis engages with said cam member.

17. A recording and/or reproducing apparatus according to claim 16, wherein said second chassis includes a slide groove for engaging with said cam member.

18. A recording and/or reproducing apparatus according to claim 15, wherein said cam member imparts a driving force for moving the second chassis relative to the first chassis.

19. A recording and/or reproducing apparatus according to claim 18, further comprising a rotating lever, which is rotatably supported by the first chassis and engaged with said cam member and the second chassis.

20. A recording and/or reproducing apparatus according to claim 13, wherein said second chassis has a guide member for guiding the first link.

21. A recording and/or reproducing apparatus according to claim 13, wherein the driving member comprises a cam member rotatably supported by the first chassis.

* * * * *

UNITED STATES PATENT AND TRADEMARK OFFICE
CERTIFICATE OF CORRECTION

PATENT NO. : 6,122,136

DATED : September 19, 2000

INVENTOR(S): AKIRA TOMITAKA

It is certified that error appears in the above-identified patent and that said Letters Patent is hereby corrected as shown below:

COLUMN 7
    Line 36, "of" should be deleted.

COLUMN 8
    Line 7, "links" should read --link--.
    Line 13, "link," should read --link, and--.
    Line 59, "link," should read --link, and--.

Signed and Sealed this

Fifteenth Day of May, 2001

*Attest:*

NICHOLAS P. GODICI

*Attesting Officer*    *Acting Director of the United States Patent and Trademark Office*